(12) United States Patent
Gehlot

(10) Patent No.: US 6,198,559 B1
(45) Date of Patent: Mar. 6, 2001

(54) AUTOMATIC DELAY COMPENSATION FOR GENERATING NRZ SIGNALS FROM RZ SIGNALS IN COMMUNICATIONS NETWORKS

(75) Inventor: Narayan L. Gehlot, Sayerville, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/197,071

(22) Filed: Nov. 20, 1998

(51) Int. Cl.$^7$ .................................................. H04B 10/00
(52) U.S. Cl. ..................... 359/161; 359/181; 359/184; 359/185; 359/158; 375/359; 375/360
(58) Field of Search ..................... 359/161, 181, 359/184, 185, 158; 375/359, 360

(56) References Cited

U.S. PATENT DOCUMENTS 5,339,183 * 8/1994 Suzuki ................................. 359/123
5,491,576 * 2/1996 Bergano ............................... 359/156
5,724,459 * 3/1998 Banba et al. ........................... 385/3

* cited by examiner

Primary Examiner—Leslie Pascal
Assistant Examiner—Hanh Phan
(74) Attorney, Agent, or Firm—Gibbons, Del Deo, Dolan, Griffinger & Vecchione

(57) ABSTRACT

The present invention is a method of automatic delay compensation for use in data transmission, particularly in optical communication systems. The invention presents an inter-coding, real-time automated delay compensation method that minimizes the effects of polarization and inter-symbol interference without expensive dispersion compensation fiber in each data transmission channel. The invention is a simple-to-use, cost effective, single-wavelength method of delayed signal alignment with coarse and fine tuning that while conserving half of the power used to transmit wavelength information in conventional WDM (wavelength division multiplexing) systems.

36 Claims, 3 Drawing Sheets

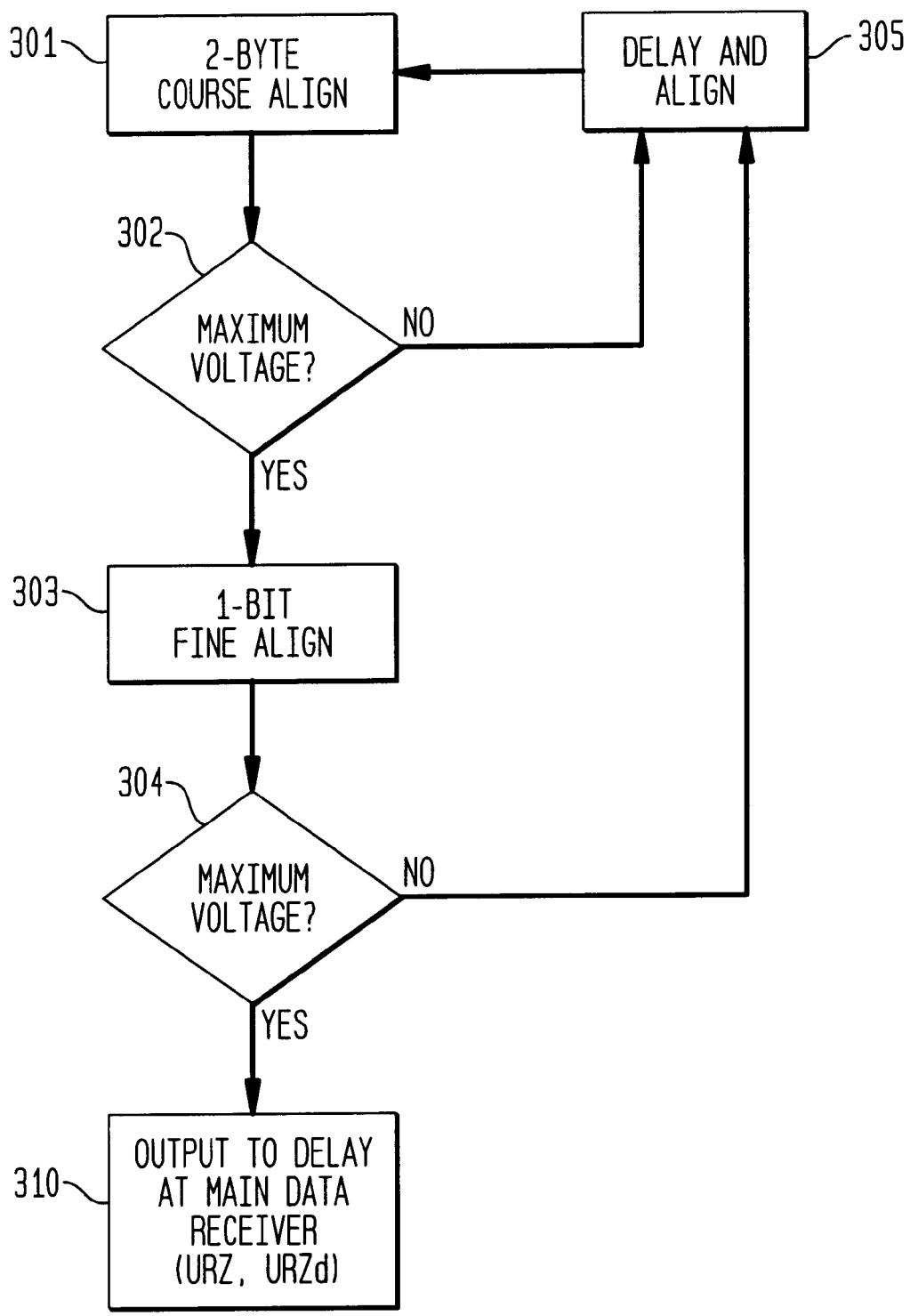

AUTOMATIC DELAY COMPENSATION FOR GENERATING NRZ SIGNALS FROM RZ SIGNALS IN COMMUNICATIONS NETWORKS

CROSS REFERENCE TO RELATED APPLICATIONS

This application is related to U.S. patent application Ser. No. 09/197,823, entitled "SYSTEM AND METHOD FOR GENERATING NRZ SIGNALS FROM RZ SIGNALS IN COMMUNICATIONS NETWORKS" (GEHLOT-7); U.S. Pat. application Ser. No. 09/198,984 entitled "ERROR DETECTION AND CORRECTION IN SYSTEMS RECEIVING NRZ SIGNALS FROM TRANSMISSION OF RZ SIGNALS" (GEHLOT-11); U.S. patent application Ser. No. 09/197,154, entitled "SYSTEM AND METHOD FOR IMPROVED SIGNAL TO NOISE RATIO IN OPTICAL COMMUNICATIONS NETWORKS" (GEHLOT-10); U.S. patent application Ser. No. 09/197,390, entitled "SYSTEM AND METHOD FOR REDUCTION OF IMPACT FROM UNWANTED SIGNALS IN OPTICAL COMMUNICATIONS SYSTEMS" (GEHLOT-8); U.S. patent application Ser. No. 09/197,222, entitled "APPARATUS AND METHOD TO OVERCOME DISPERSION LIMITATIONS IN HIGH SPEED COMMUNICATIONS SYSTEMS AND NETWORKS" (GEHLOT-5); U.S. patent application Ser. No. 09/197,073, entitled "APPARATUS AND METHOD FOR REDUCING OPTICAL IMPAIRMENTS IN OPTICAL COMMUNICATIONS SYSTEMS AND NETWORKS" (GEHLOT-6); and U.S. patent application Ser. No. 09/197,403, entitled "APPARATUS AND METHOD FOR REDUCING PHASE MODULATED GAIN FLUCTUATIONS IN OPTICAL COMMUNICATIONS SYSTEMS AND NETWORKS" (GEHLOT-12); the related applications being concurrently filed with the present application, all of the related applications having the same inventor, and all of the aforementioned related applications being incorporated herein by reference.

FIELD OF INVENTION

The present invention is in the field optical transmission of information. In particular, the invention relates to an inter-coding automatic delay compensation method for transmitting unipolar return-to-zero (URZ) signals and receiving unipolar non-return-to-zero (UNRZ) signals in optical communication systems such as wavelength division multiplexing (WDM).

BACKGROUND OF INVENTION

Data transmission in long fiber transmission paths (such as undersea or transcontinental cable or lightwave transmission paths) are subject to signal fading and accompanying degradation in the signal-to-noise ratio (SNR) that are caused by effects of polarization. Signal fading and associated SNR degradation can also result from chromatic dispersion, material dispersion in the fiber, and polarization mode dispersion. Polarization is particularly described herein to demonstrate its effects on SNR and signal fading.

In a long lightwave transmission system with optical amplifiers, the SNR can fluctuate in a random manner due to various types of dispersion. Dispersion (such as the types of dispersion described above) causes delays in the data transmission channel, particularly in channels with long fiber-optic transmission paths. When the SNR of a signal in such a lightwave transmission system becomes unacceptably small, a signal fade has occurred.

Signal fading and the associated SNR fluctuations are caused by a number of polarization dependent effects induced by the optical fiber itself and other optical components (e.g., repeaters, amplifiers, etc.) along the optical fiber transmission path. In systems using optical amplifiers between the transmitter and the receiver, the gain from an amplifier is dependent on the state of polarization (SOP) of the lightwave entering the optical amplifier. Optical amplifiers with resynchronization capabilities reduce the effects of signal fading and address the delay problem due to long fiber-optic transmission paths. For optimal signal performance, the SOP of the optical amplifier matches that of the incoming lightwave so that a maximum possible gain is achieved at the output of the lightwave. The SOP of the lightwave is determined by the shape of the polarization ellipse, i.e., the direction of the major axis and the ratio of the major axis to the minor axis $E_{ox}/E_{oy}$, and the phase difference $$\text{Phase}_{polarization} = \text{phase}_x - \text{phase}_y$$

Random polarization fluctuations result because of random polarization phase changes or individual random amplitude change of polarization states, or both. In particular, signal fading due to polarization-dependent effects over long optical fiber transmission paths can be attributed to polarization-dependent loss (PDL), polarization-dependent gain (PDG), polarization mode dispersion (PMD) and polarization-dependent hole-burning (PDHB). All of these effects impact the SOP of an optical signal being propagated along the long optical fiber transmission path, and thus the effectiveness of optical amplifiers in offsetting signal fading and delay from the transmission medium.

A conventional solution to rectify the delay and signal fading problem in an optical channel is to simultaneously launch two signals of different wavelengths and substantially orthogonal relative polarizations into the same transmission path. Since the two signals are launched with equal power and orthogonal SOPs, the overall transmitted signal is essentially unpolarized. This has the advantage of reducing the deleterious effects of the transmission channel's non-linear signal-to-noise interactions, and signal delay caused by PDHB. Even though the average SNR performance improvement with such an arrangement can be substantial, such a system is still subject to significant signal fading and channel delay. Moreover, the two-wavelength source is still subject to signal fading. Moreover, it is costly and a waste of power to use two wavelengths to transmit data because only half the bandwidth required is needed to carry useful information. In addition, hardware resources such as dispersion compensation fiber, manual compensation tracking or variable dispersion compensation per channel in WDM, which may also be addressed to this problem, are expensive and burdensome to implement. In particular, a two-wavelength dispersion compensation technique for reduction of signal fading is practically unrealizable because information translation from one channel to another channel on a real-time basis is almost impossible to perform due to channel ranges and non-linearities in WDM.

Therefore, there exists a need for a simple, cost-effective single-wavelength dispersion compensation technique for reducing effects of optical signal fading, without using an additional channel. Furthermore, an automated dispersion compensation method is needed for reduction of signal fading on a real-time basis without optical signal power penalty and without prohibitive, additional retransmission adjustment methods. A dispersion compensation method is needed to rectify signal fading and SNR degradation due to various factors in optical transmission such as polarization, chromatic dispersion, material dispersion in the fiber and polarization mode dispersion.

SUMMARY OF THE INVENTION

The problems related to signal fading in long optical fiber transmission paths is overcome by using a cost-effective, easy-to-use automatic delay compensation method in accordance with the invention. The method of the invention provides an inter-coding automatic synchronization technique that transmits unipolar return-to-zero (URZ) data and receives unipolar non-return-to-zero (UNRZ) data, incorporating a synchronization reference signal transmitted using the low energy regions in the transmitter power spectrum without additional channel requirements. The invention presents a single-wavelength, real-time automated delay compensation method that minimizes the effects of polarization and inter-symbol interference without expensive dispersion compensation fiber in each data transmission channel. The invention can be used in delay compensation for transmitting information over communication systems such as wireless, optical, modem, cable television, free space media, or data networks.

BRIEF DESCRIPTION OF THE DRAWINGS

FIG. 3 is a flow diagram of coarse and fine signal adjustment according to the method of the invention.

DETAILED DESCRIPTION

Figure 1:
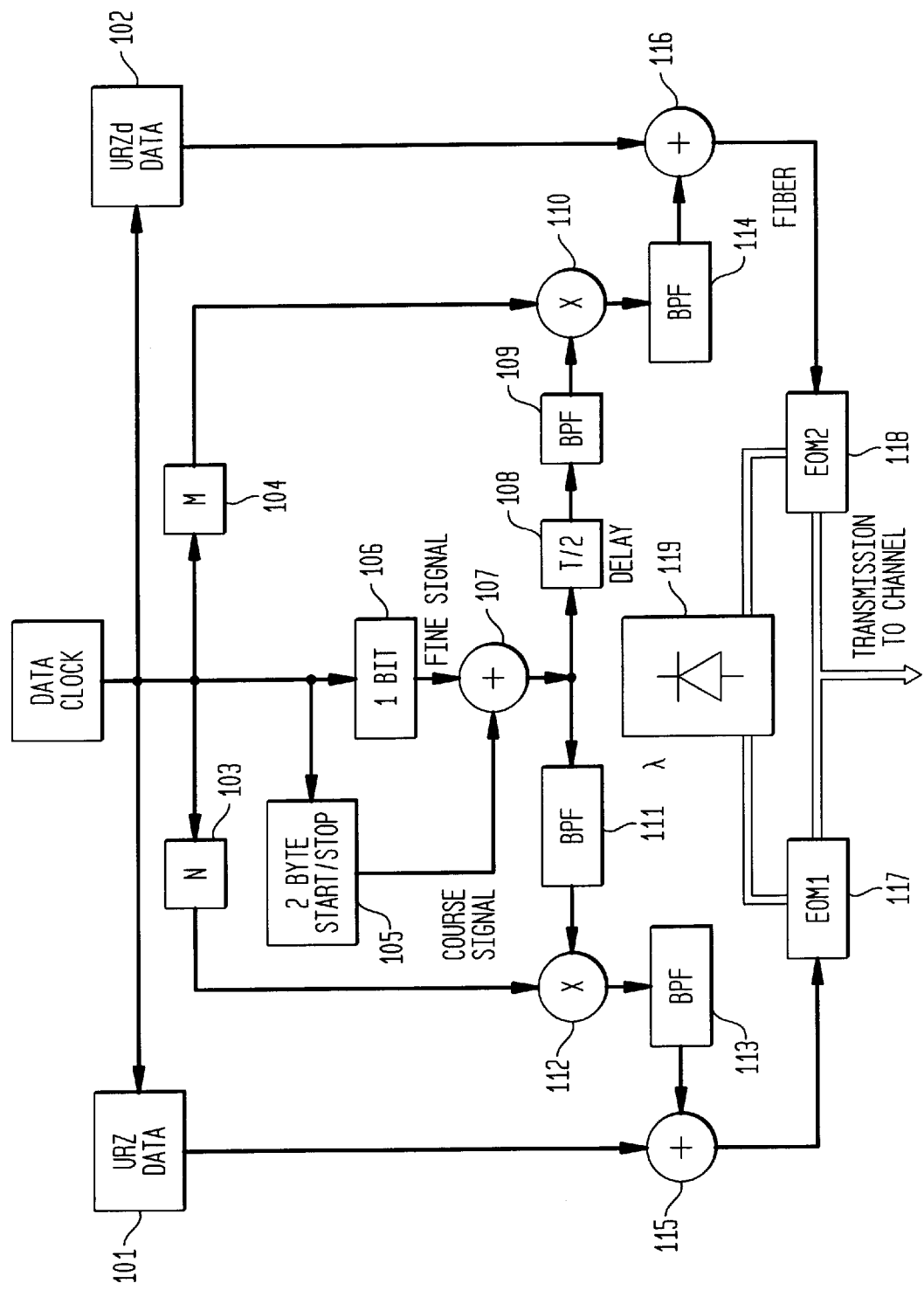
FIG. 1 provides a schematic illustrative of a transmitter according to the method of the invention.

The method of the invention is an inter-coding dispersion compensation technique in which data are transmitted in URZ format and received in UNRZ format, while conserving hardware and software resources without memory and bandwidth penalty. The invention uses a dual-stage synchronization approach of coarse and fine tuning while using only a single optical wavelength transmission path. In order to achieve such an improvement in power penalty while using only one wavelength channel, the present invention takes advantage of a unique hybrid coding scheme that enables two occurrences of identical URZ data to be transmitted (one occurrence being delayed by a given amount) where the two transmissions are later combined to produce UNRZ data. As is explained more fully in co-pending U.S. patent application Ser. No. 09/197,223 entitled "SYSTEM AND METHOD FOR GENERATING NRZ SIGNALS FROM RZ SIGNALS IN COMMUNICATION NETWORKS" (GEHLOT-7), which is incorporated herein by reference, this hybrid coding method has significant advantages over prior art in that it is an efficient way to receive UNRZ data by transmitting URZ coded data. This is significant, particularly for optical systems, in that URZ coded data has properties that favor optical transmission and it is therefore desirable to be able to transmit URZ data instead of UNRZ data and still be able to realize the benefits of receiving UNRZ data.

Preferred embodiments of the invention are hereafter described. It is noted that, while the method of the invention is illustrated based on URZ and UNRZ coding, it will readily be seen by those ordinarily skilled in the art that such method can be modified for other coding or modulation techniques applied in an all-optical or a combination of optical and electrical communication systems. Although effects of polarization on delay and signal fading are described herein, the dispersion compensation method in the invention can also be used to rectify optical signal fading and delay in the data channel due to various factors such as chromatic dispersion, material dispersion in the fiber and polarization mode dispersion. The invention can be used in conjunction with single-path, two-path or multi-path transmission channels.

The method of the invention uses a dual-stage synchronization approach that uses coarse and fine tuning in order to ascertain proper alignment of URZ and $URZ_d$ data transmitted in an optical communications system. In accordance with the invention, coarse tuning monitors and compares a 2-byte sample of data in both the URZ and $URZ_d$ signals. Fine tuning, on the other hand, monitors and compares a 1-bit (or 1-pulse) sample of data in both the URZ and $URZ_d$ signals. Prior to transmission to the data channel, the transmitter modulates both the 2-byte and 1-bit data samples with two offset frequencies, $f_N$ and $f_M$, that provide a reference for the coarse and fine tuning. At the receiver, the two reference frequencies ($f_N$ and $f_M$) are tapped and the coarse and fine tuning sample data recovered. After performing the coarse and fine tuning operations at the receiver, the results of that coarse and fine tuning are fed back to the main data channel in the receiver and applied for the URZ and $URZ_d$ signals to achieve proper alignment for those signals. Once synchronization of the two signals is accomplished, the receiver combines the URZ and $URZ_d$ signals to obtain a UNRZ signal that is representative of the original data at the data source.

FIG. 1 illustrates a transmitter according to the method of the invention. Referring to the figure, the data clock is operated to drive a frequency synthesis means such as one using direct digital synthesis (DDS). That frequency synthesis means operates to generate two offset frequencies from the clock frequency ($f_M$ and $f_N$) which are applied at 103 and 104. Preferably, the offset frequencies will be chosen in a region in the transmitting spectrum characterized by low signal energy. An exemplary DDS chip for use as the frequency synthesizer is the AD7008 DDS Modulator found in the ANALOG DEVICES REFERENCE MANUAL 1994, REV. A, pages 21–35 through 21–41, which is incorporated by reference herein.

Referring again to the choice of the offset frequencies, $f_N$ and $f_M$, in the low energy portion of the transmission spectrum, those frequencies may be selected from either a higher frequency region or a lower frequency region of the data spectrum. For transmission of URZ data, the low energy regions preferably start beyond 1.5 times the clock rate. The clock rate multiplication factors for the frequency synthesizer are indicated as N (103) and M (104) in the figure. Although N and M may be equal, for the illustrated embodiment, it is preferred that N not be equal to M.

Assuming, for example, the data clock is operating a 5 Ghz N and M could be set at 1.09 and 1.08, respectively. After multiplication by the clock rate, the offset frequencies of $f_N$ and $f_M$ become $f_N$=5×1.09=5.45 Ghz, and $f_m$=5×1.08= 5.40 Ghz, respectively. The frequency translation based on the indicated values of N and M results in the offset frequency signal being in the frequency range of (5 ✕ 0.5) Ghz, which represents a low-energy region in the data spectrum.

Two-byte coarse alignment clock signal (2-Byte Start/Stop at 105) and 1-bit fine alignment signal (1-BIT at 106) are then selected in the transmitter. Coarse tuning at 105 and fine tuning at 106 insert into the data stream two reference signals that monitor a 2-byte interval and a 1-bit interval, respectively, in the data stream. For example, in coarse tuning the system injects a reference signal with a pulse that starts and stops in two bytes, e.g., 1111, to monitor data in the interval of those two bytes. Similarly, in fine tuning the system injects a reference signal with a single pulse that starts and stops in one bit to monitor data in the single-bit interval. To avoid overlapping alignment tracking, the 2-byte interval of coarse tuning and the 1-bit interval of fine tuning preferrably are established at least two bytes apart.

The coarse and fine tuning signals are summed together by Adder 107. The summed signal is delayed by a half-bit period (T/2) at Delay 108 for superposition with $URZ_d$ encoded data, from $URZ_d$ Data source 102, at Adder 116. Prior to that superposition operation, however, the summed coarse and fine tuning signals are applied to modulate the offset frequency $f_M$ at Multiplier 110.

In a similar fashion, the summed coarse and fine tuning signals are used to modulate offset frequency $f_N$ (at Multiplier 112) and that modulated signal is then added to the URZ encoded data (from URZ Data source 101) at Adder 115. Band pass filters (BPF) are used to restrict noise bandwidth where appropriate (e.g., 109, 111, 113 and 114).

Both URZ and $URZ_d$ signals now have coarse and fine reference signals incorporated in their data streams. After modulation of an optical carrier from Laser 119 by external optical modulators EOM1 and EOM2, the URZ and $URZ_d$ modulated signals are combined and transmitted in an optical transmission channel to a receiving location.

For implementation in a WDM system, a skilled artisan can readily see that the transmitter in FIG. 1 is advantageously transmitting data on a single wavelength. According to the method of the invention, dispersion compensation is advantageously performed on a dual-stage synchronization basis of modulating URZ and $URZ_d$ data with coarse (2-byte alignment) and fine (1-bit alignment) tuning, without requiring an extra channel for transmitting additional wavelength information. System resources are optimally conserved since additional compensation fiber and variable compensation mechanisms for unnecessary channel requirements are eliminated.

Figure 2:
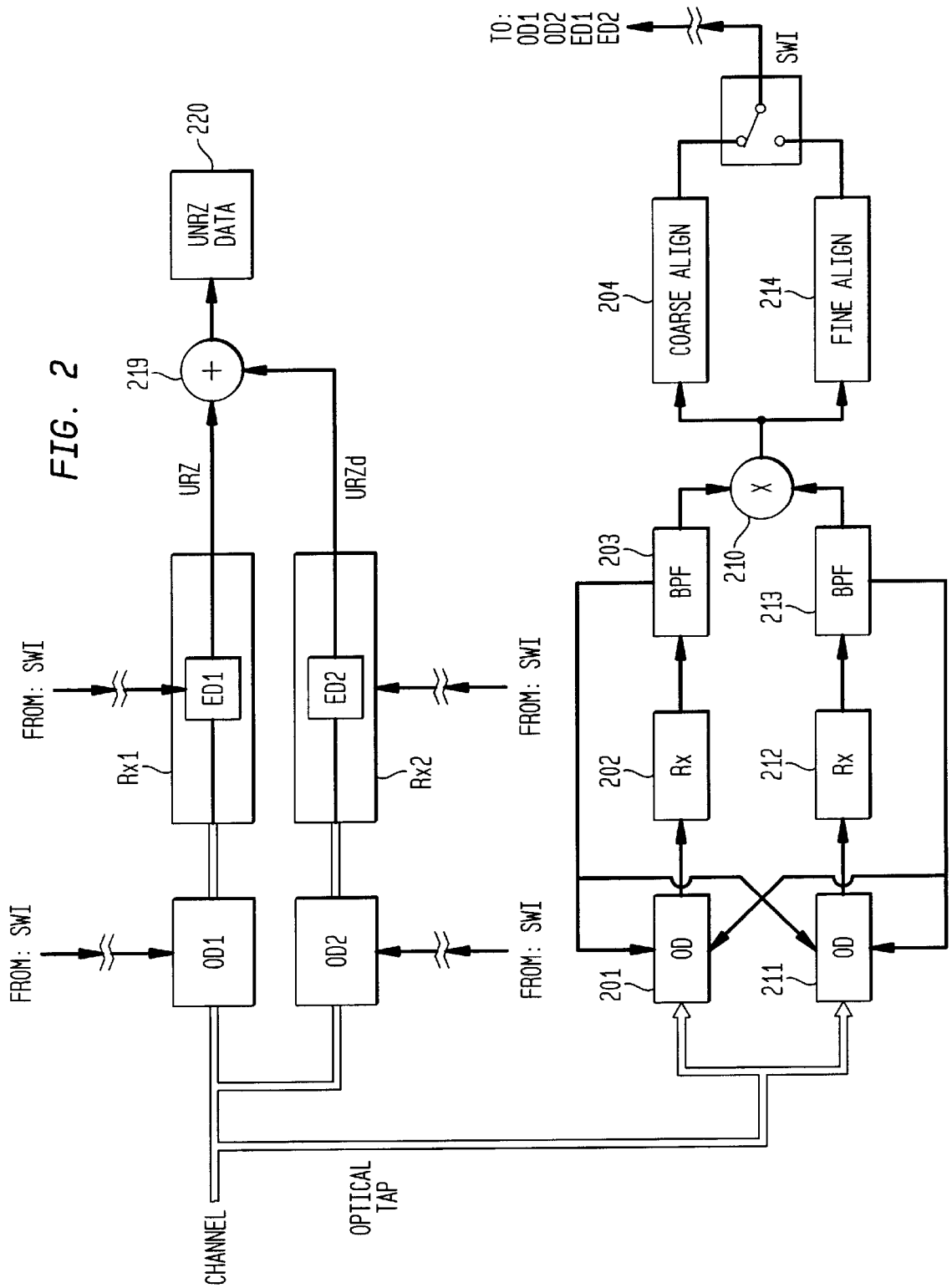
FIG. 2 provides a schematic illustrative of a receiver according to the method of the invention.

FIG. 2 illustrates a receiver according to the method of the invention, which will be operated in conjunction with the transmitter in FIG. 1. Referring to FIG. 2, after incoming data are received from the transmission channel, the data are sent to a main data channel (which is the combination of OD1, OD2, Rx1, Rx2, 219 and 220). At the same time, a portion of the received optical signal is split off by an Optical Tap (as shown) and provided to a separate synchronization channel where the coarse and fine tuning signals are recovered and applied. The task of the main data channel is to split the incoming data into two signals, apply appropriate delay for those two signals to obtain URZ and $URZ_d$ signals in synchronization, and combine the two signals to obtain UNRZ data. Optical delays are performed at OD1 and OD2. Electrical delays are performed at ED1 and ED2, which are integrated in receivers Rx1 and Rx2, respectively. The URZ and $URZ_d$ signals are combined by adder 219 to obtain UNRZ data at 220.

With respect to the synchronization portion of the received optical signal which is split off at the Optical Tap, this signal is first split into two portions with one portion initially applied to Optical Delay (OD) element 201 and the other portion applied to OD 211. After application of appropriate delay by OD 201 and OD 211, the data signals are sent to Receivers (Rx) 203 and 213, which operate, respectively, to detect and recover the synchronization reference information associated with offset frequencies $f_N$ and $f_M$, along with a sampled portion of the transmitted data. Band pass filters (BPF) are used to restrict noise bandwidth at 203 and 213, respectively. A synchronization reference signal and a data signal are multiplied by Multiplier 210 with the resultant being operated on by either Coarse Align 204 or Fine Align 214. Note that Coarse Align 204 and Fine Align 214 are operated alternatively and each functions independently with Multiplier 210. The specific operation of Coarse Align 204 and Fine Align 214 is described below in conjunction with FIG. 3.

The setting of switch (SW1) determines which alignment (coarse 204) or (fine 214) is being run. For the case illustrated in the figure, SW1 is set to coarse alignment 204. After coarse alignment is performed and synchronization is determined for a 2-byte interval, then fine alignment begins to operate in order to determine synchronization for a 1-bit interval. During the operation of coarse and fine alignment at 204 and 214, respectively, the system feeds back alignment data to optical delays at 201, 211, at the input to the synchronization stage, and, through switch SW1, to optical delays OD1, OD2, and electrical delays ED1, ED2 of the main data channel, for delay adjustment in order to achieve signal synchronization. After synchronization is achieved, URZ and $URZ_d$ signals from Rx1 and Rx2, respectively, are combined by adder 219 to obtain UNRZ data (220) which are representative of the original data at the data source of the transmitter in FIG. 1.

FIG. 3 is a flow diagram of coarse and fine signal adjustment according to the method of the invention. Assuming SW1 at FIG. 2 initially sets the system for coarse alignment, the first step (301 of FIG. 3) sets a 2-byte interval in which data alignment is monitored. According to the method of the invention, a data signal and a reference signal are multiplied by a multiplier (such as 210 in FIG. 2) to obtain a multiplication result. Then the result is tested to see if it matches the maximum voltage at 302. The multiplication can result in a minimum or a maximum voltage, depending on the current alignment of the two signals. A minimum voltage (e.g., 0 volts) result indicates that the two signals are completely out of sync. A maximum voltage result indicates that the two signals are perfectly aligned. If the multiplication produces a result that is falls between the minimum and the maximum voltages, the signals are re-aligned and multiplied again for the maximum voltage test. The process is repeated until the multiplication result matches the maximum result.

Referring again to FIG. 3, step 302 performs the maximum voltage test (described hereinabove) on the alignment of the two signals. If the multiplication result does not reach maximum voltage, the two signals are re-aligned at 305. The process is repeated until the multiplication result at 302 matches the maximum voltage, which indicates synchronization of the two signals for the 2-byte interval.

Once coarse alignment is complete, step 303 begins the process of fine alignment. Step 304 performs the maximum voltage test on the alignment of the two signals in a 1-bit interval. If the multiplication result does not reach maximum voltage, the data signal and the reference (fine) signal are re-aligned at 305 and are sent to 301 where the process of coarse alignment starts again. Once coarse alignment is ascertained at 302, the process of fine alignment is re-started at 303. The process is repeated until the multiplication result at 304 matches the maximum voltage, which indicates synchronization of the two signals for the 2-byte and the 1-bit intervals.

CONCLUSION

The invention relates to a method of automatic delay compensation for use in data transmission, particularly in optical communication systems. The present invention is a single-wavelength dispersion compensation method that reduces signal fading due to effects of polarization in long optical fiber transmission paths. In particular, the invention presents a simple-to-use, cost effective method of delayed signal alignment using coarse (2-byte) and fine (1-bit) tuning while conserving half of the power used to transmit wavelength information in conventional WDM systems.

Changes and modifications in the specifically described embodiments can be carried out without departing from the scope of the invention. Although preferred embodiments are disclosed herein, they do not limit the scope of the present invention.

I claim:

1. An automatic delay compensation method for correcting effects of optical channel delay when transmitting data across a propagation medium, the method comprising the steps of:

coding a set of data to form a first URZ encoded data set;

causing a second URZ encoded data set for the set of data to be provided, wherein the second URZ encoded data set is delayed relative to the first URZ encoded data set by a given time period;

causing at least one interval of reference data of a first size to be incorporated in the first and second URZ encoded data sets;

causing at least one interval of reference data of a second size to be incorporated in the first and second URZ data sets, where the interval of a second size is smaller than the interval of a first size;

using the at least one interval of reference data of a first size for coarse tuning synchronization of a comparably sized interval of the data;

using the at least one interval of reference data of a second size for fine tuning synchronization of a comparably sized interval of the data;

synchronizing the first and second URZ encoded data sets based on the coarse tuning and the fine tuning; and after synchronizing the first URZ encoded data set and the second URZ encoded data set, summing the first URZ encoded data set and the second URZ encoded data set, yielding a UNRZ coding for the set of data.

2. The method of claim 1, wherein the interval of reference data of a first size is one byte and the interval of reference data of a second size is at least one bit and less than one byte.

3. The method of claim 1, wherein the interval of reference data of a first size is two bytes and the interval of reference data of a second size is one bit.

4. The method of claim 1, wherein the interval of reference data of a second size is displaced from the interval of reference data of a first size by at least the magnitude of the interval of reference data of a first size.

5. The method of claim 1, wherein the given time period by which the second URZ encoded data set is delayed relative to the first URZ encoded data set is one half the bit interval of the data.

6. The method of claim 1, wherein the propagation medium consists of the group of single-wavelength WDM (wavelength division multiplexing) channel, single-path data transmission channels, two-path data transmission channels and multi-path data transmission channels.

7. The method of claim 1 applied in a system that consists of the group of wireless, optical, cable, modem, and free space media communications systems.

8. The method of claim 1, further comprising the steps of:

modulating the at least one interval of reference data of a first size with an offset frequency $f_N$; and modulating the at least one interval of reference data of a second size with an offset frequency $f_M$;

wherein the modulating steps cause the at least one interval of reference data of a first size and the at least one interval of reference data of a second size to fall into a low energy region in the power spectrum of the data.

9. The method of claim 8, wherein the offset frequencies are generated by using direct digital synthesis.

10. The method of claim 1, including a further step of performing a maximum voltage test, comprising the substeps of:

setting a maximum voltage;

multiplying a portion of data from an encoded data set with the at least one interval of reference data of a first size, yielding a multiplication result;

comparing the multiplication result with the maximum voltage;

if the multiplication result is less than the maximum voltage, delaying the encoded data set containing the portion of data and repeating the multiplying and comparing substeps until the multiplication result is equal to the maximum voltage.

11. The method of claim 10, wherein the encoded data set is the first URZ encoded data set.

12. The method of claim 10, wherein the encoded data set is the second URZ encoded data set.

13. The method of claim 1, including a further step of performing a maximum voltage test, comprising the substeps of:

setting a maximum voltage;

multiplying a portion of data from an encoded data set with the at least one interval of reference data of a second size, yielding a multiplication result;

comparing the multiplication result with the maximum voltage;

if the multiplication result is less than the maximum voltage, delaying the encoded data set containing the portion of data and repeating the multiplying and comparing substeps until the multiplication result is equal to the maximum voltage.

14. The method of claim 13, wherein the encoded data set is the first URZ encoded data set.

15. The method of claim 13, wherein the encoded data set is the second URZ encoded data set.

16. The method of claim 1, including a further step of performing a maximum voltage test, comprising the substeps of:

setting a maximum voltage;

a first multiplying substep for multiplying a portion of data from an encoded data set with the at least one interval of reference data of a first size, yielding a first multiplication result;

a first comparing substep for comparing the first multiplication result with the maximum voltage;

if the first multiplication result is less than the maximum voltage, delaying the encoded data set containing the portion of data and repeating the first multiplying substep and the first comparing substep until the first multiplication result is equal to the maximum voltage;

a second multiplying substep for multiplying another portion of data from the encoded data set with the at least one interval of reference data of a second size, yielding a second multiplication result;

a second comparing substep for comparing the second multiplication result with the maximum voltage;

if the second multiplication result is less than the maximum voltage, delaying the encoded data set containing the another portion of data and repeating the second multiplying substep and the second comparing substep until the second multiplication result is equal to the maximum voltage.

17. The method of claim 16, wherein the encoded data set is the first URZ encoded data set.

18. The method of claim 16, wherein the encoded data set is the second URZ encoded data set.

19. An automatic delay compensation apparatus for correcting effects of optical channel delay when transmitting data across a propagation medium, comprising:

means for coding a set of data to form a first URZ encoded data set;

means for causing a second URZ encoded data set for the set of data to be provided, wherein the second URZ encoded data set is delayed relative to the first URZ encoded data set by a given time period;

means for causing at least one interval of reference data of a first size to be incorporated in the first and second URZ encoded data sets;

means for causing at least one interval of reference data of a second size to be incorporated in the first and second URZ data sets, where the interval of a second size is smaller than the interval of a first size;

means for using the at least one interval of reference data of a first size for coarse tuning synchronization of a comparably sized interval of the data;

means for using the at least one interval of reference data of a second size for fine tuning synchronization of a comparably sized interval of the data;

means for synchronizing the first and second URZ encoded data sets based on the coarse tuning and the fine tuning; and after synchronizing the first URZ encoded data set and the second URZ encoded data set, means for summing the first URZ encoded data set and the second URZ encoded data set to yield a UNRZ coding for the set of data.

20. The apparatus of claim 19, wherein the interval of reference data of a first size is at least one byte and the interval of reference data of a second size is at least one bit and less than one byte.

21. The apparatus of claim 19, wherein the interval of reference data of a first size is two bytes and the interval of reference data of a second size is one bit.

22. The apparatus of claim 19, wherein the interval of reference data of a second size is displaced from the interval of reference data of a first size by at least the magnitude of the interval of reference data of a first size.

23. The apparatus of claim 19, wherein the given time period by which the second URZ encoded data set is delayed relative to the first URZ encoded data set is one half the bit interval of the data.

24. The apparatus of claim 19, wherein the propagation medium consists of the group of single-wavelength WDM (wavelength division multiplexing) channel, single-path data transmission channels, two-path data transmission channels and multi-path data transmission channels.

25. The apparatus of claim 19 being used in a system that consists of the group of wireless, optical, cable, modem, and free space media communications systems.

26. The apparatus of claim 19, further comprising:

means for modulating the at least one interval of reference data of a first size with an offset frequency $f_N$; and means for modulating the at least one interval of reference data of a second size with an offset frequency $f_M$;

wherein the two modulating means cause the at least one interval of reference data of a first size and the at least one interval of reference data of a second size to fall into a low energy region in the power spectrum of the data.

27. The apparatus of claim 26, wherein the two offset frequencies are generated by using direct digital synthesis.

28. The apparatus of claim 19, including a maximum voltage test means, further comprising:

means for setting a maximum voltage;

means for multiplying a portion of data with the at least one interval of reference data of a first size to yield a multiplication result; and means for comparing the multiplication result with the maximum voltage;

wherein, upon the multiplication result being less than the maximum voltage, the encoded data set containing the portion of data is caused to be delayed, and the multiplication by the multiplying means and the comparison by the comparing means are repeated, with additional delay added at each iteration until the multiplication result is equal to the maximum voltage.

29. The apparatus of claim 28, wherein the encoded data set is the first URZ encoded data set.

30. The apparatus of claim 28, wherein the encoded data set is the second URZ encoded data set.

31. The apparatus of claim 19, including a maximum voltage test means, further comprising:

means for setting a maximum voltage;

means for multiplying a portion of data with the at least one interval of reference data of a second size to yield a multiplication result; and means for comparing the multiplication result with the maximum voltage;

wherein, upon the multiplication result being less than the maximum voltage, the encoded data set containing the portion of data is caused to be delayed, and the multiplication by the multiplying means and the comparison by the comparing means are repeated, with additional delay added at each iteration until the multiplication result is equal to the maximum voltage.

32. The apparatus of claim 31, wherein the encoded data set is the first URZ encoded data set.

33. The apparatus of claim 31, wherein the encoded data set is the second URZ encoded data set.

34. The apparatus of claim 19, including a maximum voltage test means, further comprising:

means for setting a maximum voltage;

a first means for multiplying a portion of data from an encoded data set with the at least one interval of reference data of a first size to yield a first multiplication result;

a first means for comparing the first multiplication result with the maximum voltage;

wherein, upon the first multiplication result being less than the maximum voltage, the encoded data set containing the portion of data is caused to be delayed, and the multiplication by the first multiplying means and the comparison by the first comparing means are repeated, with additional delay added at each iteration until the first multiplication result is equal to the maximum voltage; and a second means for multiplying another portion of the data from an encoded data set with the at least one interval of reference data of a second size to yield a second multiplication result;

a second means for comparing the second multiplication result with the maximum voltage;

wherein, upon the second multiplication result being less than the maximum voltage, the encoded data set containing the portion of data is caused to be delayed, and the multiplication by the second multiplying means and the comparison by the second comparing means are repeated, with additional delay added at each iteration until the second multiplication result is equal to the maximum voltage.

35. The apparatus of claim 34, wherein the encoded data set is the first URZ encoded data set.

36. The apparatus of claim 34, wherein the encoded data set is the second URZ encoded data set.

* * * * *